(12) United States Patent
Deng (10) Patent No.: US 12,345,494 B1
(45) Date of Patent: Jul. 1, 2025

(54) TRIPOD FOR RIFLE HUNTING

(71) Applicant: Guangdong Laitu Imaging Technology Co., Ltd., Zhongshan (CN)

(72) Inventor: Tongling Deng, Zhongshan (CN)

(73) Assignee: Guangdong Laitu Imaging Technology Co., Ltd., Zhongshan (CN)

( * ) Notice: Subject to any disclaimer, the term of this patent is extended or adjusted under 35 U.S.C. 154(b) by 21 days.

(21) Appl. No.: 18/390,577

(22) Filed: Dec. 20, 2023

(51) Int. Cl.
*F41A 23/12* (2006.01)
*F16M 11/16* (2006.01)
*F16M 11/32* (2006.01)

(52) U.S. Cl.
CPC ............. *F41A 23/12* (2013.01); *F16M 11/16* (2013.01); *F16M 11/32* (2013.01)

(58) Field of Classification Search
None
See application file for complete search history.

(56) References Cited

U.S. PATENT DOCUMENTS

| | | | | |
|---|---|---|---|---|
| 1,324,604 | A * | 12/1919 | McKinney | F41A 23/12 89/40.06 |
| 1,335,403 | A * | 3/1920 | Stanley | F41A 23/12 89/40.06 |
| 7,178,767 | B2 * | 2/2007 | Steyn | F16B 7/14 248/440 |
| 7,959,123 | B1 * | 6/2011 | Kitscha | F16M 11/32 248/188 |
| 11,396,971 | B2 * | 7/2022 | Mendo | F16M 11/245 |
| 11,815,220 | B1 * | 11/2023 | Chang | F16M 11/16 |
| 11,976,779 | B2 * | 5/2024 | Johnson, Sr. | F16M 11/16 |
| 2011/0260016 | A1 * | 10/2011 | Johnson | F16M 11/32 248/220.21 |
| 2014/0299726 | A1 * | 10/2014 | Johnson | F16M 11/32 248/168 |
| 2023/0184372 | A1 * | 6/2023 | Thomason | F16M 11/16 248/157 |

\* cited by examiner

*Primary Examiner* — Steven M Marsh (57) ABSTRACT

The present invention discloses a tripod for rifle hunting comprising a connecting head with legs hinged thereto. The legs can rotate inwardly or outwardly relative to the connecting head around a hinge axis, and a locking component is installed on the connecting head to limit inward rotation of the legs. Compared to existing technology, the locking component on the connecting head restricts the legs after they are extended, preventing inward rotation relative to the connecting head. This ensures that the legs do not rotate inward due to kick recoil during shooting, thus maintaining the stability of the tripod and preventing collapse due to kick recoil force.

7 Claims, 8 Drawing Sheets

TRIPOD FOR RIFLE HUNTING

FIELD OF INVENTION

The present invention relates to the field of tripods, in particular to a tripod for rifle hunting.

BACKGROUND OF THE INVENTION

In existing firearm shooting scenarios, such as rifle hunting, tripods are used as a support to provide a stable platform for the firearm. Current tripods, when in use, are connected with the firearm by components such as a head or a mounting bracket.

During use, the legs of the tripod are rotated outward relative to the connecting head, allowing all legs to be extended for support. The design of these tripods is derived from camera tripods in which the legs cannot be locked after being rotated outwardly, which may cause them to rotate inwardly under force. Therefore, the kick recoil force generated during shooting with existing tripods may cause the legs to rotate inward relative to the connecting head, affecting the stability of the tripod and even causing the tripod to collapse.

SUMMARY OF THE INVENTION

The aim of the present invention is to solve at least one of the technical problems existing in the present technology. To this end, the present invention proposes a tripod for rifle hunting that can limit the inward rotation of the legs.

The tripod for rifle hunting designed for this purpose comprises a connecting head, with legs hinged to the connecting head. These legs can rotate inwardly or outwardly around a hinge axis relative to the connecting head. A locking component is installed on the connecting head to limit the inward rotation of the legs.

Preferably, the locking component includes a movable element that moves longitudinally relative to the connecting head, and the movable element contacts the legs.

Preferably, the movable element comprises a limit platform and multiple guide posts mounted on the limit platform. Multiple guide holes are formed on the connecting head, with the guide posts movably inserted into these guide holes from the bottom to the top. Each guide post features a travel limit slot with positioning slots at both ends. A limit member is disposed on the connecting head and is movably inserted into the travel limit slot, with a positioning end of the limit member designed for insertion into the positioning slots.

Preferably, a locking platform is installed below the limit platform and is rotatable relative to the limit platform.

A limit deck is provided above the legs, with locking recesses formed on the legs below the limit deck. Locking protrusions are provided on the locking platform, which can rotate and be embedded in the locking recesses when the locking platform rotates relative to the limit platform.

Preferably, multiple positioning recesses are formed on the upper surface of the locking platform, and mounting holes are formed on the limit platform. An elastic component is installed in each mounting hole, connected to a positioning component that can be embedded in the positioning recess.

Preferably, a rotating axis is installed on the limit platform, connected to the locking platform.

Preferably, arcuate limit recesses are formed on the legs, with the side wall of the movable element attaching these arcuate limit recesses.

Preferably, a control lever is installed on the locking platform.

Preferably, a threaded mounting hole connected to the guide hole is formed on the connecting head, and the limit member is screwed into the threaded mounting hole.

Compared to existing technology, the present invention uses the locking component installed on the connecting head to limit the inward rotation of the legs. This locking component restricts the legs after they are extended, preventing them from rotating inwardly relative to the connecting head. This ensures the stability of the tripod during shooting and prevents the tripod from collapsing due to the recoil force of the kick.

DETAILED DESCRIPTION OF THE PREFERRED EMBODIMENTS

The following detailed description of the present invention is provided in conjunction with the accompanying drawings and embodiments.

Refer to FIGS. 1-8 for a tripod designed for rifle hunting, comprising a connecting head 10. Legs 20 are hinged to the connecting head 10 and can rotate inwardly or outwardly around a hinge axis relative to the connecting head 10. A locking component 30 is installed on the connecting head 10 to limit the inward rotation of the legs 20.

During use, the legs 20 are successively rotated outwardly relative to the connecting head 10 for deployment. Once all of the legs 20 are extended, the locking component 30 locks them in place to prevent inward rotation relative to the connecting head 10. This ensures that the legs do not rotate inwardly due to kick recoil during shooting, thus maintaining the stability of the tripod and preventing collapse.

The connecting head 10 is used to connect with a head, a mounting bracket, or other components.

Figure 1:
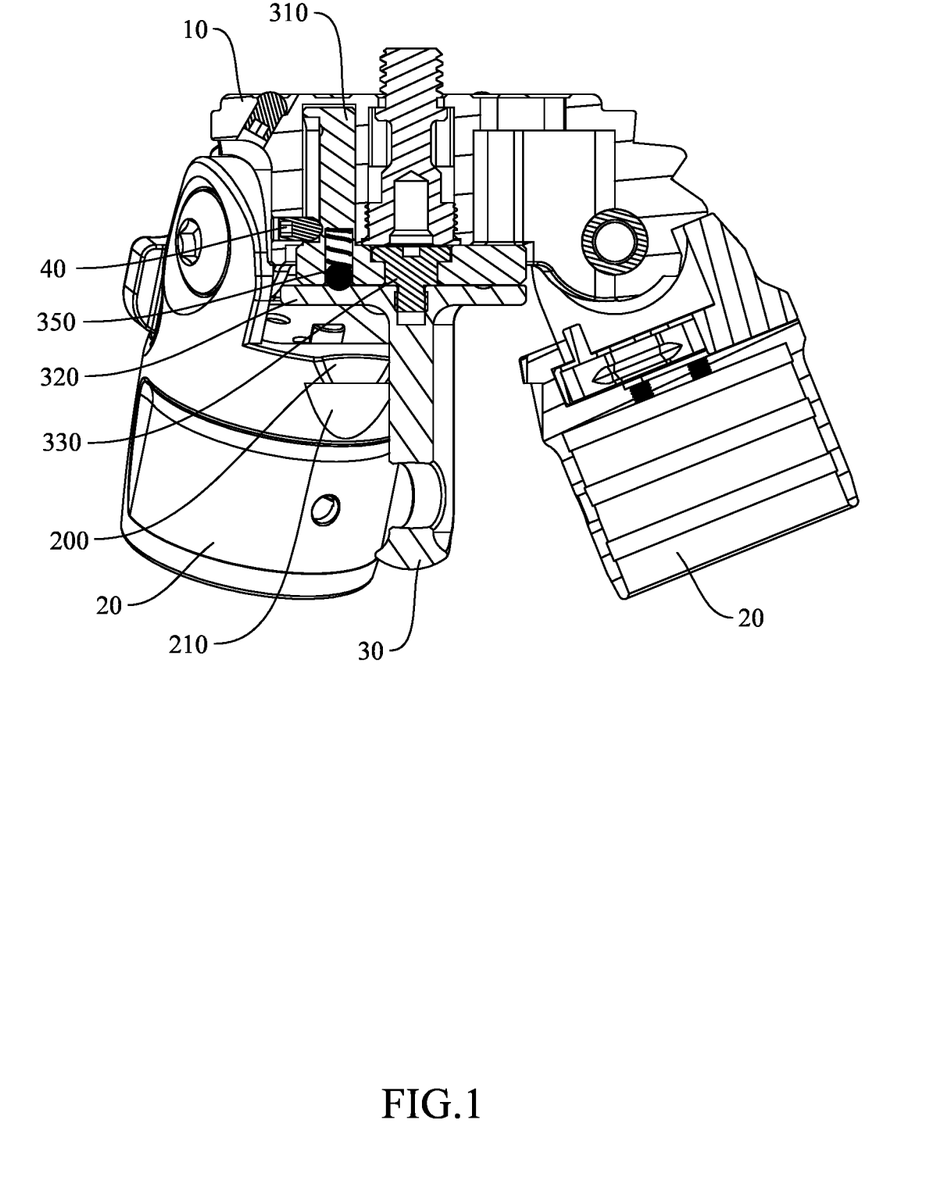
FIG. 1 is a first schematic of a cross-sectional structure of the locking component in an unlocked state.
Figure 2:
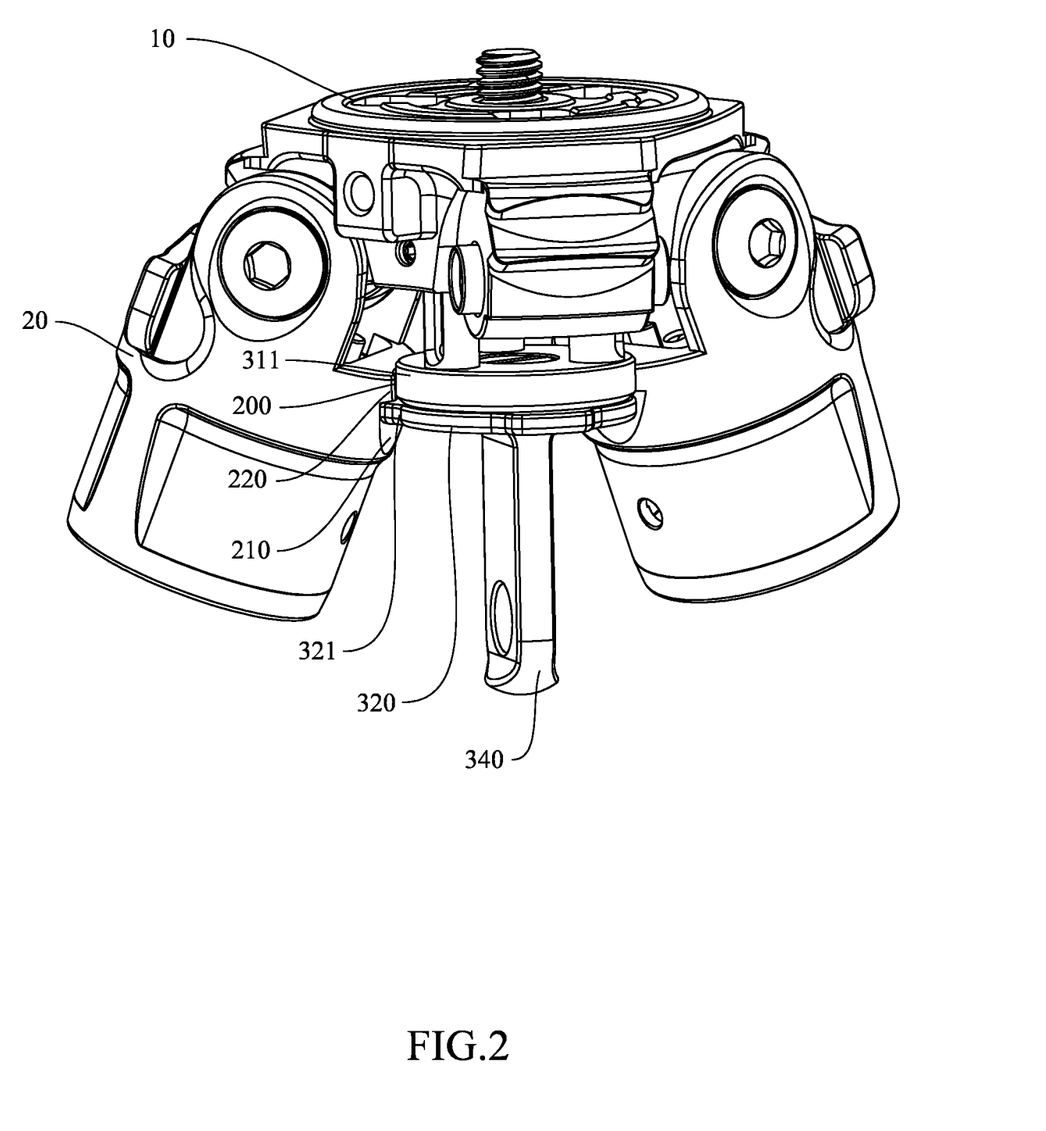
FIG. 2 is a first schematic of a three-dimensional structure of the locking component in a locked state.
Figure 3:
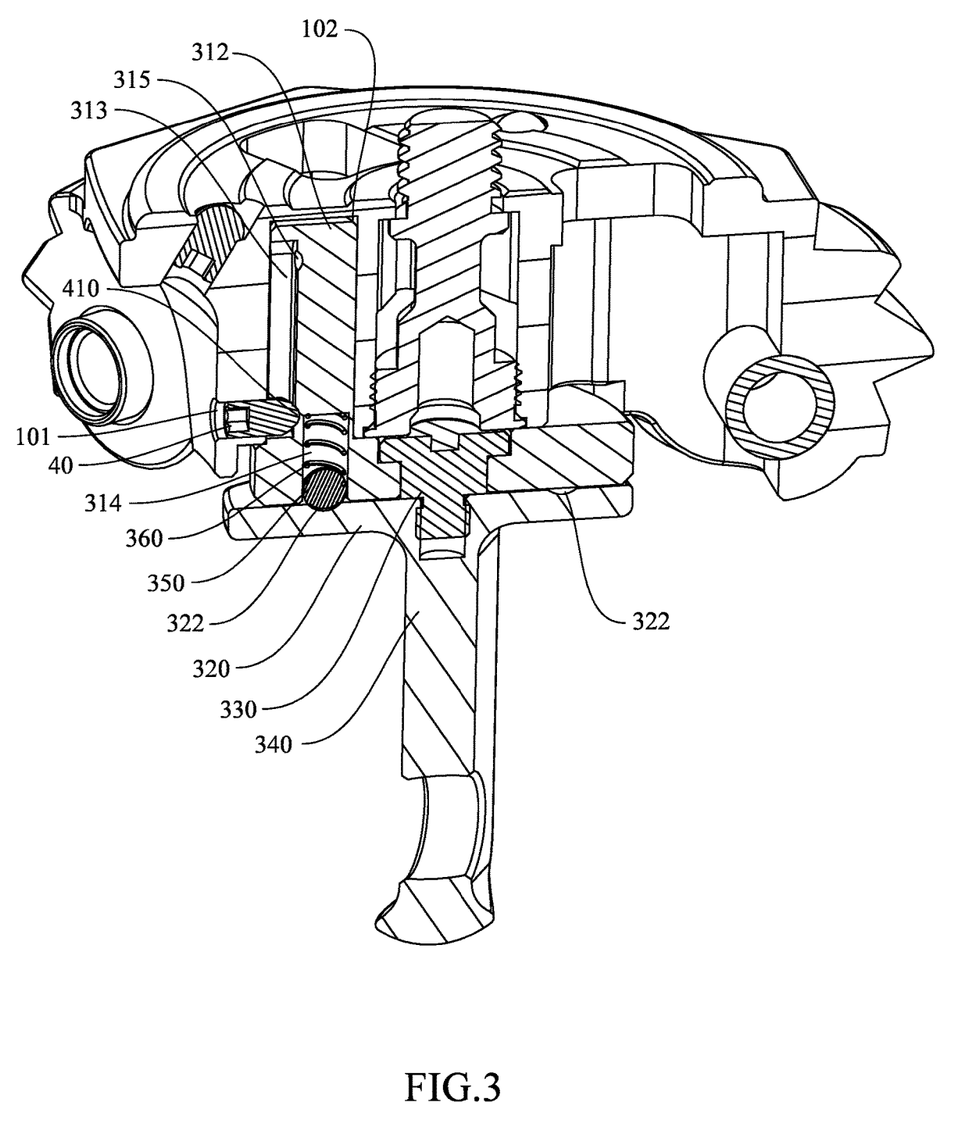
FIG. 3 is a second schematic of the cross-sectional structure of the locking component in the unlocked state.
Figure 4:
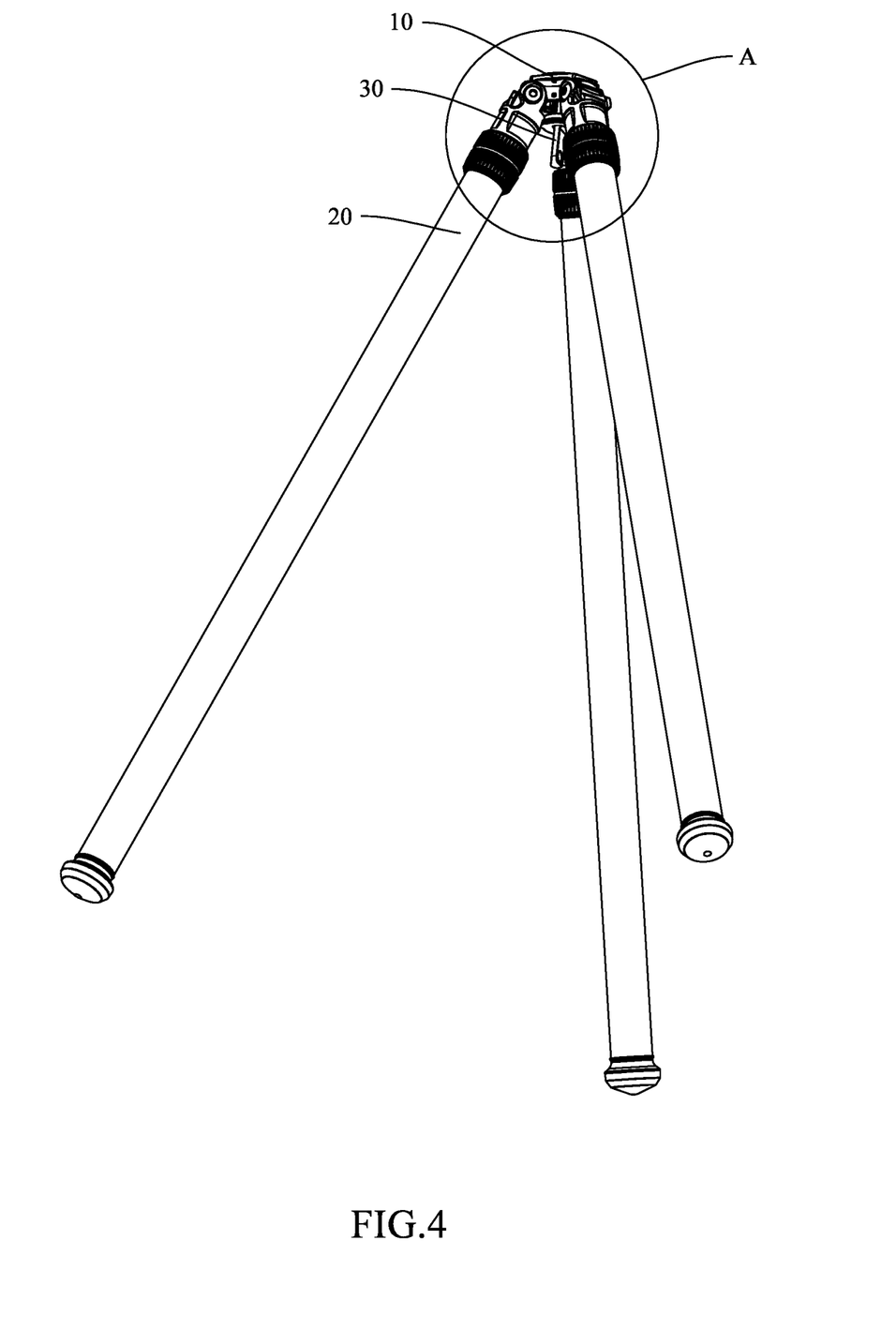
FIG. 4 is a second schematic of a three-dimensional structure of the locking component in the locked state.

As seen in FIGS. 1 to 3, the locking component 30 includes a movable element 310 that moves longitudinally relative to the connecting head 10, wherein the movable element 310 contacts the legs 20.

When locked, the movable element 310 is pulled down to contact the legs 20, a state in which the movable element 310 is used as a stopper to prevent inward rotation.

The movable element 310 comprises a limit platform 311 and multiple guide posts 312 mounted on the limit platform 311. Multiple guide holes 102 are formed on the connecting head 10, with the guide posts 312 movably inserted into these guide holes 102 from the bottom to the top. Each guide post 312 features a travel limit slot 313 with positioning slots 315 at both ends. A limit member 40 is disposed on the connecting head 10 and is movably inserted into the travel limit slot 313, with a positioning end 410 of the limit member 40 designed for insertion into the positioning slots 315.

In the unlocked state of the movable element 310, as shown in FIG. 3, the positioning end 410 is inserted into the positioning slot 315 at the start end, thereby preventing random movement of the movable element 310, with the functionality of positioning and limiting its vertical movement.

Wherein the positioning end 410 and the positioning slot 315 are both spherical.

Wherein the number and position of the guide posts 312 correspond to the guide holes 102.

Figure 5:
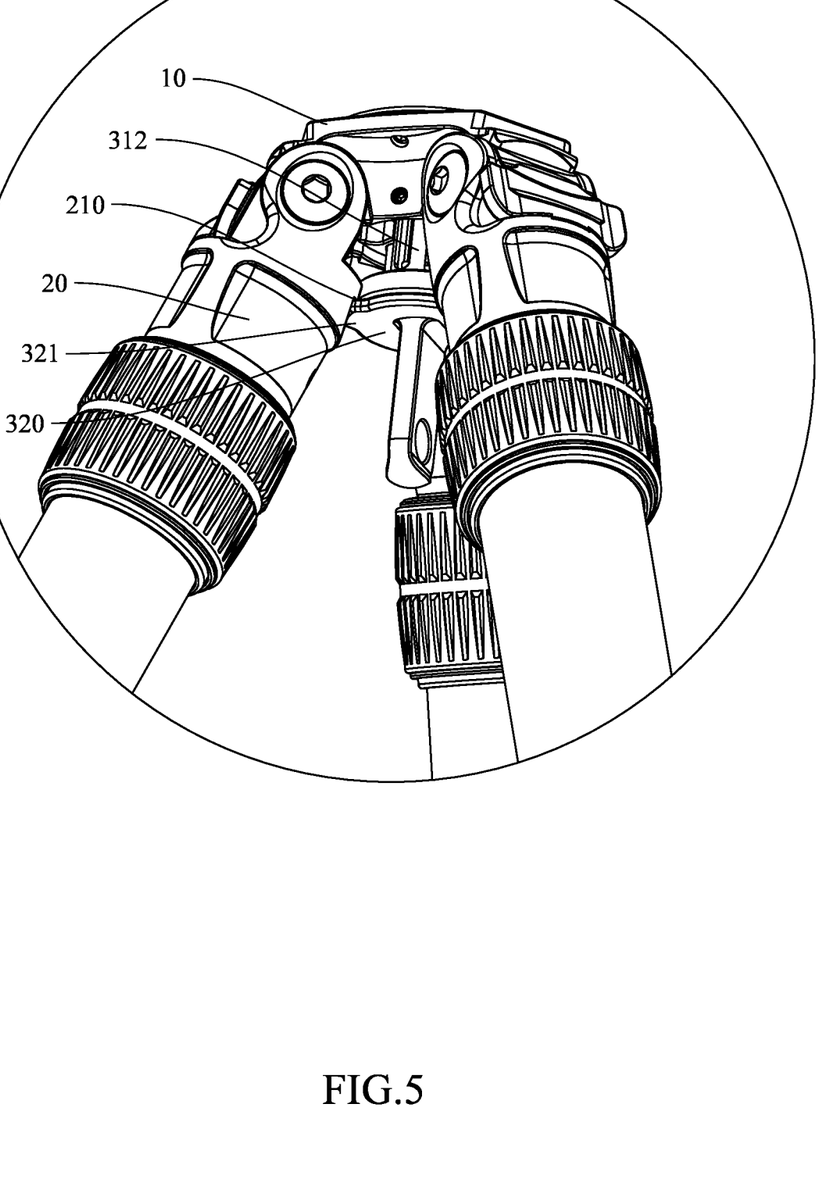
FIG. 5 is an enlarged schematic of the structure at A in FIG. 4.
Figure 6:
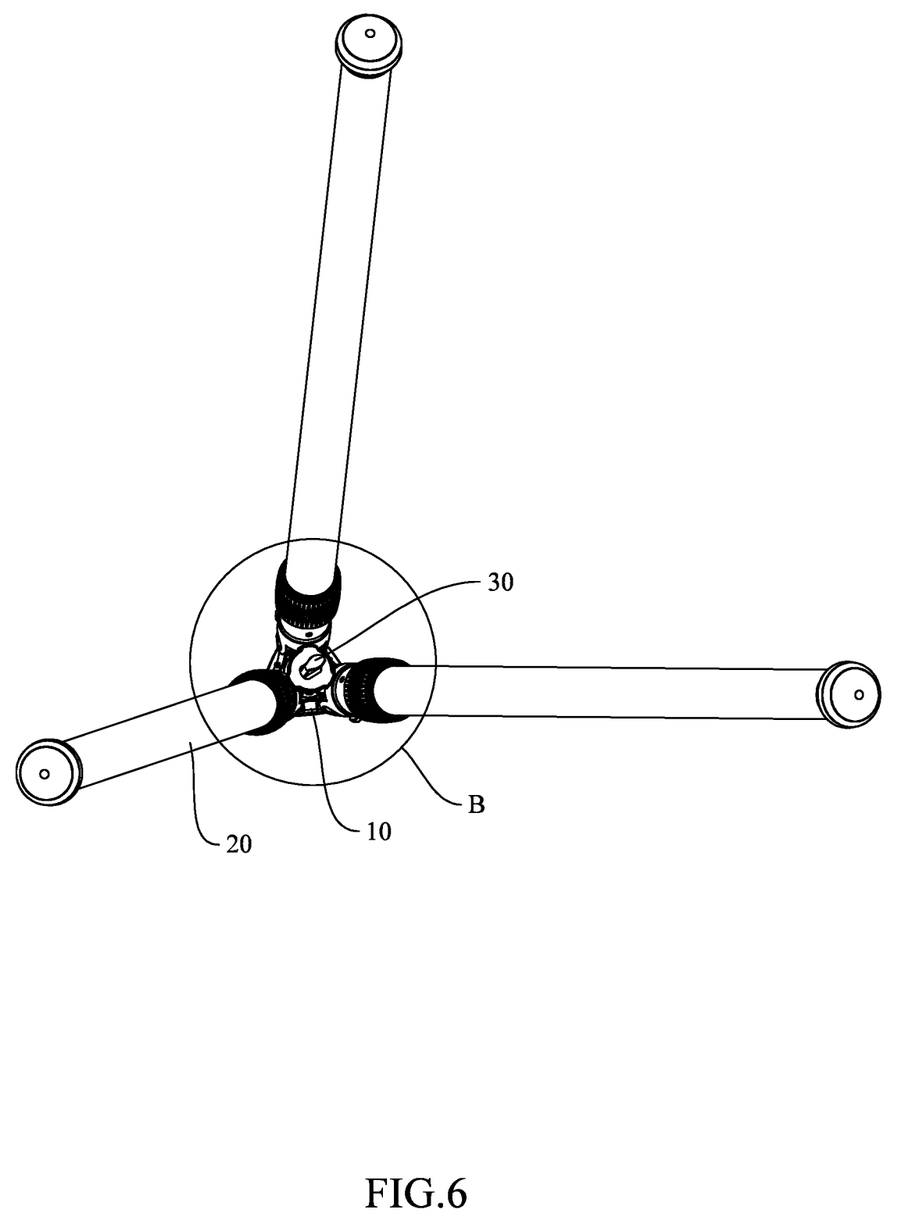
FIG. 6 is a third schematic of a three-dimensional structure of the locking component in the locked state.
Figure 7:
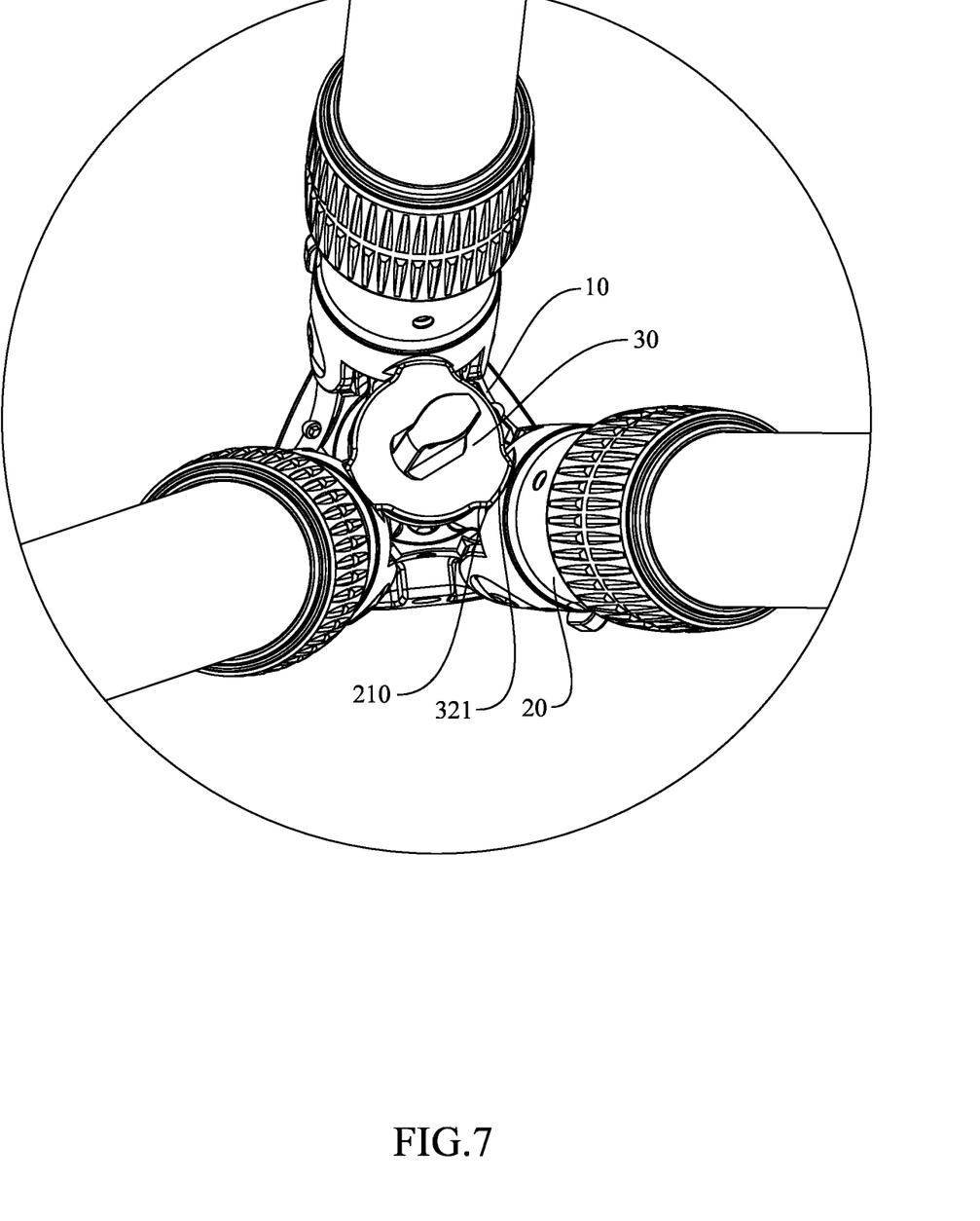
FIG. 7 is an enlarged schematic of the structure at B in FIG. 6.
Figure 8:
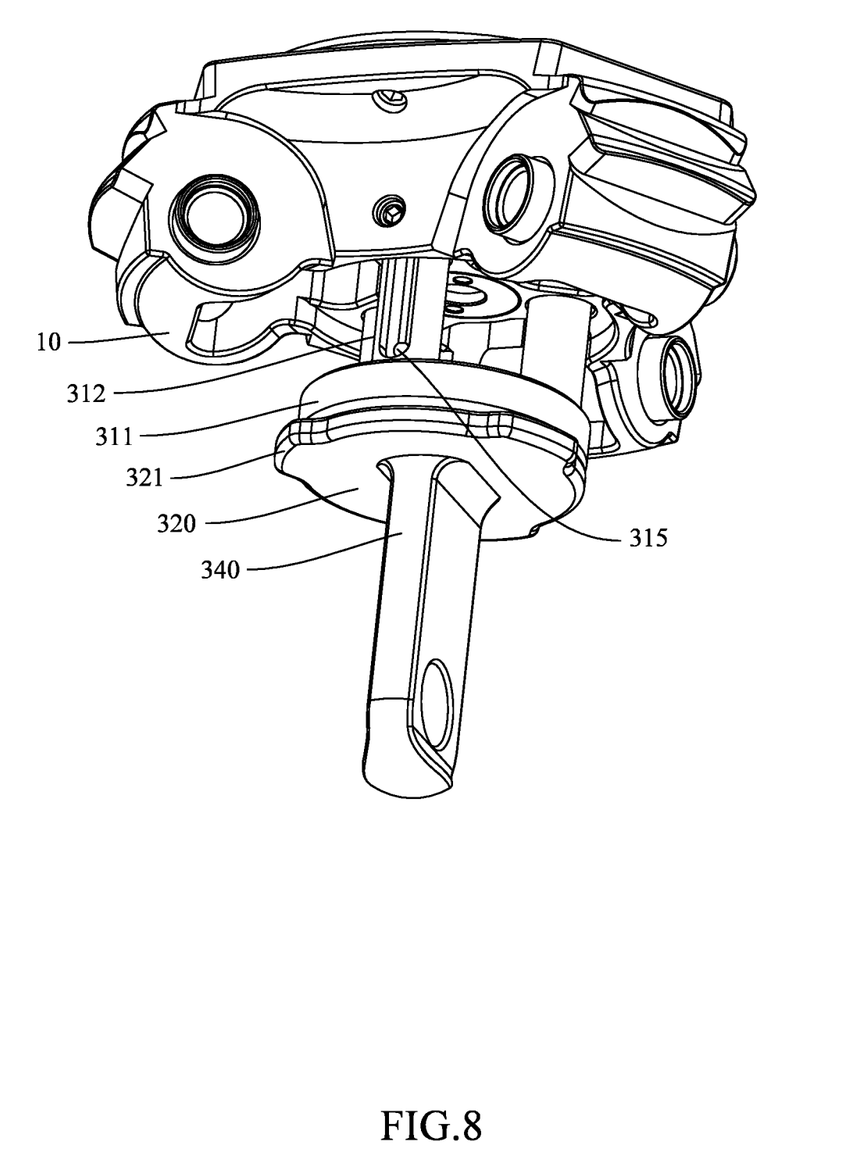
FIG. 8 is a schematic of a structure connecting the head and the locking component.

As shown in FIGS. 2 and 5, a locking platform 320 is installed below the limit platform 311 and is rotatable relative to the limit platform 311. A limit deck 220 is provided above the legs 20, with locking recesses 210 formed on the legs below the limit deck 220. Locking protrusions 321 are provided on the locking platform 320, which can rotate and be embedded in the locking recesses 210 when the locking platform 320 rotates relative to the limit platform 311.

In the locked state, the movable element 310 is pulled down to contact the legs 20, and then the locking platform 320 is rotated to embed the locking protrusions 321 in the locking recesses 210. In this state, the legs are doubly restrained by the locking protrusions 321 and the limit platform 311, preventing inward rotation relative to the connecting head 10. At the same time, due to the restriction of the limit deck 220 and the locking protrusions 311, the locking platform 320 cannot move directly upward and must be rotated to release the locking protrusions 321 from the locking recesses 210 before being returned upward.

As shown in FIG. 3, multiple positioning recesses 322 are formed on the upper surface of the locking platform 320, and mounting holes 314 are formed on the limit platform 311. An elastic component 360 is installed in each mounting hole 314, connected to a positioning component 350 that can be embedded in the positioning recess 322.

Under the action of the elastic component 360, the positioning component 350 is embedded in the positioning recess 322, preventing arbitrary rotation of the locking platform 320 relative to the limit platform 311. To rotate the locking platform 320, a force must be applied to drive the positioning component 350 to move upwardly, compressing the elastic component 360 until the positioning component 350 aligns with the next positioning recess 322 for further position limitation.

In the present invention, the elastic component 360 is a spring, the positioning component 350 is spherical, and the positioning recess 322 is also spherical.

The number and position of the mounting holes 314 correspond to the positioning recesses 322 and guide posts 312.

As shown in FIG. 3, a rotating axis 330 is installed on the limit platform 311, connected to the locking platform 320.

As shown in FIGS. 1 and 2, arcuate limit recesses 200 are formed on the legs 20, with the side wall of the movable element 310 attaching these arcuate limit recesses 200.

The limit platform 311 is disc-shaped and is embedded in these arcuate limit recesses 200 to complete the lock.

As shown in FIGS. 2 and 3, a control lever 340 is installed on the locking platform 320 for pulling the movable element 310 downward and controlling the rotation of the locking platform 320.

As shown in FIG. 3, a threaded mounting hole 101 connected to the guide hole 102 is formed on the connecting head 10, and the limit member 40 is screwed into this threaded mounting hole 101.

Details not described in this specification are considered to be known to those skilled in the art.

In the description of the present invention, it is to be understood that the terms "center," "longitudinal," "lateral," "length," "width," "thickness," "upper," "lower," "front," "rear," "left," "right," "vertical," "horizontal," "top," "bottom," "inside," "outside," "clockwise," "counterclockwise," and the like indicate orientation or positional relationships based on those shown in the accompanying drawings, are used solely to facilitate and simplify the description of the present invention and do not indicate or imply that the device or element referred to must have a particular orientation or be constructed and operated in a particular orientation, and are therefore not to be construed as a limitation of the present invention. The terms "first" and "second" are used for descriptive purposes only and are not to be construed as indicating or implying relative importance or implicitly specifying the number of technical features indicated.

The foregoing illustrates and describes the basic principles and main features of the present invention and the advantages of the present invention. Those skilled in the art should understand that the present invention is not limited by the foregoing embodiments and that the foregoing embodiments and the description in the specification are merely illustrative of the principles of the present invention, and that there will be various changes and improvements in the present invention without departing from the spirit and scope of the present invention, all of which fall within the scope of the present invention for which protection is sought. The scope of protection claimed for the present invention is defined by the appended claims and their equivalents.

What is claimed is:

1. A tripod for rifle hunting, comprising:
    a connecting head, with legs hinged to the connecting head and capable of rotating inwardly or outwardly around a hinge axis;
    a locking component provided on the connecting head to limit inward rotation of the legs, wherein the locking component includes a movable element that moves longitudinally relative to the connecting head and said movable element contacts the legs, wherein the movable element comprises a limit platform and multiple guide posts mounted on the limit platform;
    multiple guide holes formed on the connecting head, the multiple guide posts being movably inserted into the guide holes from a bottom to a top, wherein each guide post forms a travel limit slot with positioning slots at both ends; and
    a limit member disposed on the connecting head, the limit member being movably inserted into the travel limit slot, with a positioning end of the limit member designed for insertion into the positioning slots.

2. The tripod for rifle hunting according to claim 1, wherein a locking platform is installed below the limit platform and is rotatable relative to the limit platform;

wherein a limit deck is provided above the legs, with locking recesses formed on the legs below the limit deck, wherein locking protrusions are provided on the locking platform, which rotate and are embedded in the locking recesses when the locking platform rotates relative to the limit platform.

3. The tripod for rifle hunting according to claim 2, wherein multiple positioning recesses are formed on the upper surface of the locking platform and mounting holes are formed on the limit platform, and wherein an elastic component is installed in each mounting hole, which is connected to a positioning component that is embedded in the positioning recess.

4. The tripod for rifle hunting according to claim 2, wherein a rotating axis is installed on the limit platform, connected to the locking platform.

5. The tripod for rifle hunting according to claim 1, wherein arcuate limit recesses are formed on the legs, with the side wall of the movable element attaching the arcuate limit recesses.

6. The tripod for rifle hunting according to claim 2, wherein a control lever is installed on the locking platform.

7. The tripod for rifle hunting according to claim 1, wherein a threaded mounting hole connected to the guide hole is formed on the connecting head, and the limit member is screwed into the threaded mounting hole.

\* \* \* \* \*